United States Patent
Rao et al.

(10) Patent No.: US 12,225,006 B2
(45) Date of Patent: Feb. 11, 2025

(54) SECURE RESOURCE ACCESS BY AMALGAMATED IDENTITIES AND DISTRIBUTED LEDGER

(71) Applicant: Kyndryl, Inc., New York, NY (US)

(72) Inventors: Suryanarayana Rao, Bangalore (IN); Shiben Dutta, Bangalore (IN); Clinton Vincen C, Bangalore (IN); Vikas Lalwani, Bangalore (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 18/305,592

(22) Filed: Apr. 24, 2023

(65) Prior Publication Data

US 2023/0262061 A1    Aug. 17, 2023

Related U.S. Application Data

(62) Division of application No. 16/855,984, filed on Apr. 22, 2020, now Pat. No. 11,665,159.

(51) Int. Cl.
*H04L 9/40* (2022.01)
*G06F 21/40* (2013.01)
(Continued)

(52) U.S. Cl.
CPC ........ *H04L 63/0876* (2013.01); *H04L 9/3228* (2013.01); *H04L 63/0838* (2013.01);
(Continued)

(58) Field of Classification Search
CPC ..... H04L 63/0876; H04L 63/10; H04L 63/12; H04L 9/50; H04L 9/3239; G06F 21/40
See application file for complete search history.

(56) References Cited

U.S. PATENT DOCUMENTS 9,635,000 B1    4/2017 Muftic
10,291,622 B1 *  5/2019 Rossman ............. H04L 63/102
(Continued)

FOREIGN PATENT DOCUMENTS

CN    106779716 A    5/2017
CN    107682331 A    2/2018
(Continued)

OTHER PUBLICATIONS

Gartner Forecasts Worldwide Information Security Spending to Exceed $124 Billion in 2019, Gartner, Newsroom, Press Release, Sydney, Australia, Aug. 15, 2018, < https://www.gartner.com/en/newsroom/press- releases/2018-08-15-gartner-forecasts-worldwide-information-security-spending-to-exceed-124-billion-in-2019>.
(Continued)

*Primary Examiner* — Robert B Leung
(74) *Attorney, Agent, or Firm* — Dan Housley; Andrew D. Wright; Calderon Safran & Wright P.C.

(57) ABSTRACT

A server receives encrypted data from a protected-resource-requesting device that includes an encrypted combination of the device and user identification. The first server requests a most recent copy of data of a distributed ledger from a randomly selected logged-in workstation. The first server searches for a match of the encrypted data from the first device in the distributed ledger data received from the randomly selected workstation. In response to determining a match, the first server updates a table of a second server with a one-time-password (OTP) and a copy of the encrypted data received from the device. The first server sends the OTP and an instruction to the device to send the OTP and the encrypted data to the second server, which determines whether a match exists. In response to a confirmed match, the first server grants access to the device.

18 Claims, 4 Drawing Sheets

(51) Int. Cl.
*H04L 9/00* (2022.01)
*H04L 9/32* (2006.01)

(52) U.S. Cl.
CPC .......... *H04L 63/102* (2013.01); *H04L 63/107* (2013.01); *G06F 21/40* (2013.01); *H04L 9/50* (2022.05); *H04L 63/12* (2013.01); *H04L 2463/082* (2013.01)

(56) References Cited

U.S. PATENT DOCUMENTS

| | | | |
|---|---|---|---|
| 11,568,038 B1* | 1/2023 | Kulkarni | H04L 9/3271 |
| 2005/0283619 A1 | 12/2005 | Min | |
| 2006/0080545 A1 | 4/2006 | Bagley | |
| 2007/0079135 A1 | 4/2007 | Saito | |
| 2013/0019298 A1* | 1/2013 | Jover Segura | H04L 63/1466 |
| | | | 726/7 |
| 2014/0068252 A1* | 3/2014 | Maruti | H04L 9/0866 |
| | | | 713/162 |
| 2016/0323265 A1* | 11/2016 | Esdaile | H04W 12/06 |
| 2017/0076518 A1* | 3/2017 | Patterson | G06F 21/00 |
| 2017/0134380 A1* | 5/2017 | Egan | H04L 63/20 |
| 2017/0149560 A1 | 5/2017 | Shah | |
| 2018/0083965 A1 | 3/2018 | Donovan | |
| 2018/0123804 A1 | 5/2018 | Smith | |
| 2018/0137512 A1 | 5/2018 | Georgiadis | |
| 2018/0234413 A1 | 8/2018 | Watanabe | |
| 2018/0287780 A1 | 10/2018 | Safford | |
| 2018/0294966 A1 | 10/2018 | Hyun | |
| 2018/0337769 A1 | 11/2018 | Gleichauf | |
| 2019/0020468 A1 | 1/2019 | Rosenoer | |
| 2019/0305964 A1 | 10/2019 | Hamel | |
| 2019/0312877 A1 | 10/2019 | Zhang et al. | |
| 2020/0036531 A1* | 1/2020 | Minovic | H04L 9/3236 |
| 2020/0084018 A1 | 3/2020 | Pande et al. | |
| 2020/0186358 A1 | 6/2020 | Capola et al. | |
| 2020/0186523 A1 | 6/2020 | Kursun et al. | |
| 2020/0342132 A1* | 10/2020 | Youssef | G06F 16/1834 |
| 2020/0401325 A1* | 12/2020 | Lamba | G06F 3/0622 |
| 2021/0176251 A1* | 6/2021 | Ozhigin | H04L 9/0618 |

FOREIGN PATENT DOCUMENTS

| | | |
|---|---|---|
| CN | 108833081 A | 11/2018 |
| EP | 3361672 A1 | 8/2018 |
| EP | 3544256 A1 | 9/2019 |
| KR | 102033042 B1 | 10/2019 |
| WO | 2018049656 A1 | 3/2018 |
| WO | 2018126029 A2 | 7/2018 |
| WO | 2018174112 A1 | 9/2018 |

OTHER PUBLICATIONS

Kikitamara, "Digital Identity Management on Blockchain for Open Model Energy System", Radbound University, Masters Thesis Informational Science, 86 pps., Aug. 23, 2017, <https://fwww.ru.nl/publish/pages/769526/digital_identity management_on_ blockchain final .pdf>.

Nagpal, "Blockchain-based authentication of devices and people", Medium, Blockchain Blog, Dec. 17, 2018, 18 pps., <https://medium.com/blockchain-blog/blockchain-based-authentication-of-devices-and-people-c7efcfcf0b32>.

List of Kyndryl Patents or Patent Applications Treated as Related, dated Apr. 21, 2023, 2 pages.

* cited by examiner

SECURE RESOURCE ACCESS BY AMALGAMATED IDENTITIES AND DISTRIBUTED LEDGER

FIELD OF THE INVENTION

The present invention relates generally to the field of online resource security, and more particularly to secure identification of device and user as a single entity and resource access authorization using a random selection of active workstations from an immutable distributed ledger.

BACKGROUND OF THE INVENTION

Organizations often make use of setup applications that create user identification (user ID, UID) credentials associated with a computing device assigned or allocated to the user. The setup applications often include the usage of a password, smart card, or biometric authentication to successfully access the operating system of the computing device. Additionally, some organizations require additional authentication to access an organization's network and protected resources accessible through the organization's network.

Computing devices accessing an organization's network are sometimes identified and authorized for access based on the detection of the media access control address (MAC address) uniquely associated with a respective computing device. Other approaches make use of multifactor authentication of the user, requiring a centralized repository of authentication credentials.

SUMMARY

Embodiments of the present invention disclose a method, computer program product, and system. The embodiments include a method to authenticate a device requesting access to protected resources. The method provides for one or more processors of a first server to receive encrypted data from a device requesting access to protected resources accessible on a network, such that the encrypted data from the device includes an encrypted combination of an identification of the device and an identification of the user of the device. The one or more processors of the first server request a most recent copy of data from a distributed ledger from a randomly selected workstation of a plurality of workstations logged-in to the network. The one or more processors of the first server search for a match of the encrypted data received from the first device in the most recent copy of distributed ledger data received from the randomly selected workstation. In response to determining a match of the encrypted data received from the device and the encrypted data found in the most recent copy of the distributed ledger data from the randomly selected workstation logged-in to the network, the one or more processors update a table of a second server with a one-time-password (OTP) and a copy of the encrypted data received from the device. The one or more processors send a copy of the OTP to the device and an instruction to send the same OTP received and the encrypted data of the device to the second server. The one or more processors receive confirmation from the second server of receipt of a password and data that is encrypted from the device, and in response to receiving a confirmation from the second server of a match between the OTP and encrypted data updated to the table of the second server and the password and data encrypted received by the second server from the device, the one or more processors authenticate the device and grant the device access to the protected resources.

DETAILED DESCRIPTION

Figure 1:
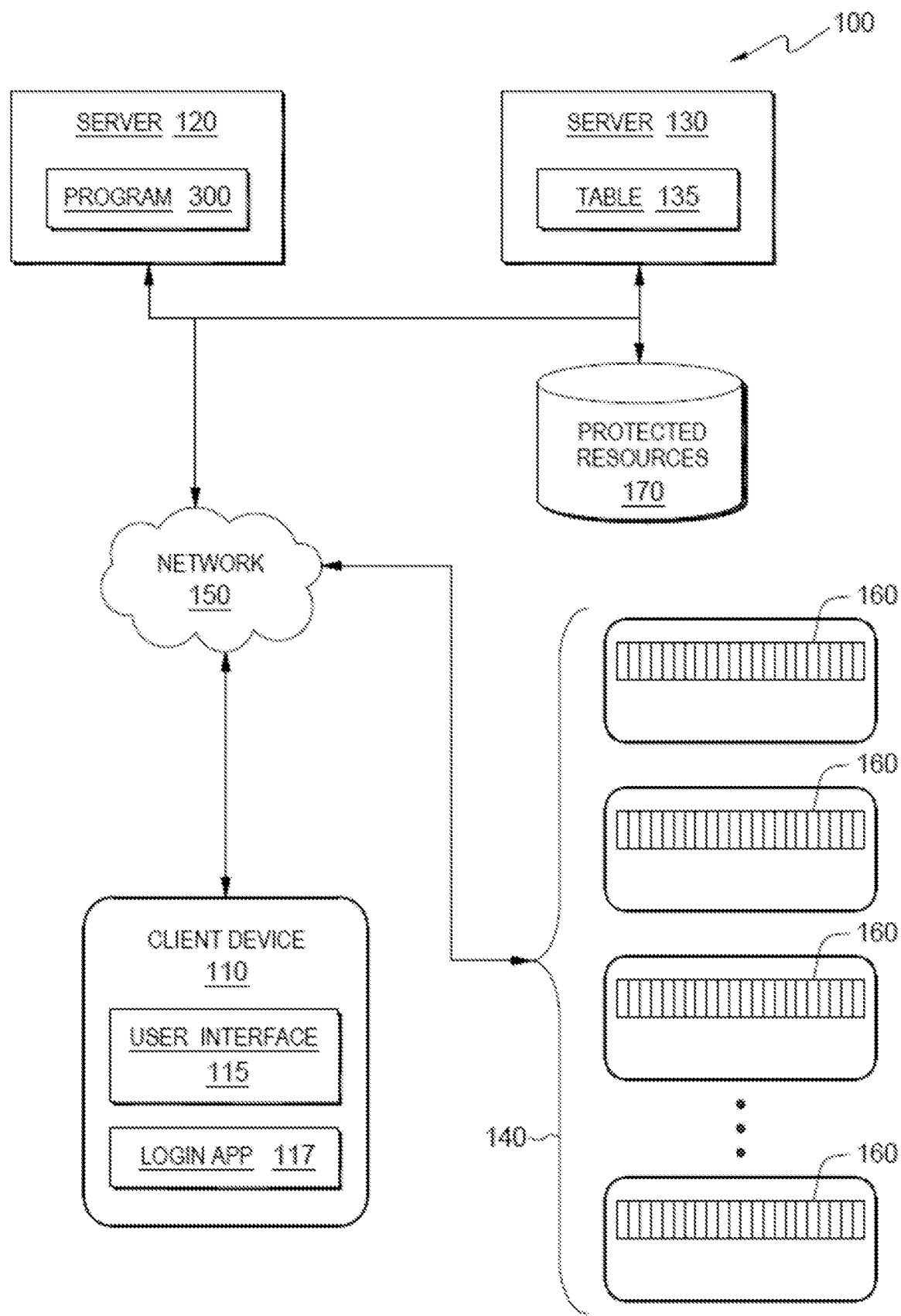
FIG. 1 is a functional block diagram illustrating a distributed data processing environment, in accordance with an embodiment of the present invention.

Embodiments of the present invention recognize that large organizations and businesses rely heavily on employee and third-party integrity to protect important and confidential data and resources. Authorized users may be bribed, tricked, or coerced into downloading protected resources on devices other than organization or business designated devices, enabling the protected resources to be compromised, stolen, manipulated, or lost. Often, protective measures involve centrally managed access credentials, which have been proven to be prone to security breaches, and still rely on individual integrity of authorized credential managing positions. Security methodologies requiring multifactor authentication validate the user but fail to limit authorized users from downloading protected resource data to unauthorized devices. Similarly, security methods that recognize specific devices assume use by an authorized user.

Embodiments of the present invention provide a method, computer program product, and computer system for secure onboarding of a device and user and authenticating the device and the user requesting access to protected resources. Embodiments include an amalgamated encrypted single entity linking a specific user and specific device for authenticating and authorizing access to protected resources. Embodiments of the present invention combine a media access control (MAC) address and a user identification (hereafter, user ID or UID) of a computing device and user of the device, respectively, combine the two in an amalgamation, and encrypt amalgamated entity. The encrypted single entity creates a user-machine combination that is more resilient to security breaches from other machines or access to protected resources by unauthorized machines and/or unauthorized users.

Embodiments provide methods to secure data by an onboarding procedure that includes machine and location identification, and authentication of both the device and the device owner requesting access by leveraging a blockchain distributed ledger of authentication credentials and validating authentication using a random selection of data from the distributed ledger. Central storage of user and device credentials is avoided, eliminating the risk of compromised storage to be mutated for unapproved access or used for impostor access. The distributed ledger acts as an immutable database for the amalgamated identifications of the users and corresponding devices.

Embodiments of the present invention include a consensus decision for machine onboarding directed to predetermined administrators operating designated approver workstation devices, which avoids security situations in which a single administrator inappropriately authorizes user access to protected resources. In some embodiments, the single entity encrypted combination of MAC address and UID are added to a distributed ledger as a hash, creating a visible record of the validated device and user combinations authorized to access protected resources. A copy of the distributed ledger is included with the validated workstation devices accessing a network within a particular organization or business. In some embodiments, the authentication process includes a random selection of a logged-in workstation device and accessing the distributed ledger copy stored on the randomly selected device to search for the hash of the single entity of the encrypted MAC address and UID combination of a device requesting access to protected resources. If a hash of the encrypted amalgamation of the MAC address of the device and UID of the requesting user is determined to match a hash found on the randomly selected copy of the distributed ledger, then access is granted to the requesting device, and otherwise denied.

In some embodiments of the present invention, computing devices added to the network for access to the protected resources include a login application (app) that is included in the initial build of the computing device and facilitates onboarding and authentication procedures. In some embodiments, a plurality of administrative workstations and corresponding users are designated as approval reviewers of the onboarding device and user combinations. Embodiments include a computing device that orchestrates the onboarding process and a separate computing device that stores onboarding credentials for authentication comparison.

In some embodiments of the present invention, authentication methods include attributes to further secure access to protected resources. The inclusion of attributes reduces the risk of malicious activity and unauthorized access potential indicated by close proximity. In embodiments, a computing device, for example, a server performing authentication activity, maintains a list of all logged-in devices and structures the information in the form of a tree structure. The tree structure is based on a "least-recently-used (LRU) device" format, such that the least-recently-used devices are positioned closer to the root of the tree structure. Selection of devices logged-in to the network, also referred to as nodes in the network, may include selection of devices that exceed a threshold distance from the onboarding device.

In some embodiments an attribute of network distance is included in the selection of logged-in devices, requiring a threshold distance of separation of the onboarding device from selected logged-in devices as determined by IP address and geo-location of the network hardware associated with the respective IP address. The network includes a group of switches, routers, hubs, and ports that have geolocation within an organization's premises, and geolocations can be further drilled down to network component identification, such as a particular set of device connected to a switch serviced by a particular router within a designated geolocation premise.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client device 110, server 120, server 130, logged-in workstations 140, and protected resources 170, all interconnected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communications between client device 110, server 120, server 130 and logged-in workstations 140, in accordance with embodiments of the present invention.

Client device 110 is a computing device submitted by a user for onboarding to a network for access to protected resources. Client device 110 may be a laptop computer, a tablet computer, a smartphone, smartwatch, a smart speaker, or any programmable electronic device capable of communicating with various components and devices within distributed data processing environment 100, via network 150. In general, client device 110 represents one or more programmable electronic devices or a combination of programmable electronic devices capable of executing machine-readable program instructions and communicating with other computing devices (not shown) within distributed data processing environment 100 via a network, such as network 150. Client device 110 includes user interface 115 and login app 117. Client device 110 may include internal and external hardware components, depicted in more detail in FIG. 4.

User interface 115 provides an interface to access the features and functions of client device 110. In some embodiments of the present invention, user interface 115 provides access to authentication program 300, operating on server 120. User interface 115 may also support access to other applications, features, and functions of client device 110 (not shown), such as onboarding and off-boarding client device 110 from the network to access protected resources. In some embodiments, user interface 115 provides display output and input functions for client device 110.

User interface 115 supports access to alerts, notifications, and provides forms of communications. In one embodiment, user interface 115 may be a graphical user interface (GUI) or web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also include mobile application software that provides respective interfaces to features and functions of client device 110. User interface 115 enables respective users of client device 110 to receive, view, hear, and respond to input, access applications, display content of online conversational exchanges, and perform available functions.

Login app 117 is an application initiated on power-up or wake-up activity of client device 110. In some embodiments, login app 117 initiates prior to full loading and access to the operating system of client device 110. In other embodiments, login app 117 is an integrated initial function of the operating system of client device 110. Login app 117 facilitates the onboarding of client device 110 to a network that with proper authorization, enables access to protected resources. Login app 117 performs hardware-based validation of the user ID (UID) and password for activating client device 110. In some embodiments, login app 117 transmits a MAC address of client device 110 to previously identified administration workstations during onboarding procedures. Similarly, during onboarding procedures, login app 117 sends the encrypted MAC address and the IP address of client device 110 to server 120 hosting authentication program 300. In response to receiving a consensus approval from administration workstations, login app 117 generates an encrypted amalgamation of the MAC address of client device 110 and the UID associated with the user of client device 110.

Server 120 is depicted as including authentication program 300. In some embodiments of the present invention, server 120 represents a virtual computing device operating based on multiple computers as a server system, such as in a cloud computing environment, and provides access and connectivity of client device 110 to authentication program 300 and other function and resources residing on server 120, via network 150.

In some embodiments, server 120 can be a web server, a blade server, a desktop computer, a laptop computer, a tablet computer, a netbook computer, or any other programmable electronic computing device capable of receiving, sending, and processing data, and communicating with features and functions of client device 110, server 130, and other computing devices (not shown) within distributed data processing environment 100 via network 150. In another embodiment, server 120 represents a computing system utilizing clustered computers and components (e.g., database server computers, application server computers, etc.) that act as a single pool of seamless resources when accessed within distributed data processing environment 100. Server 120 may include internal and external hardware components, as depicted in more detail and described in FIG. 4.

Authentication program 300 is depicted as hosted and operating from server 120. Authentication program 300 interacts with login app 117 of client device 110 and table 135 of server 130, as well as being communicatively connected with a set of predetermined administrative workstations (discussed with regard to FIG. 2) and logged-in workstations 140. Authentication program 300 provides authorization and authentication protection of online protected resources. In some embodiments of the present invention, authentication program 300 includes a multi-device onboarding consensus procedure, and an amalgamated and encrypted data entity received from a computing device requesting access to protected resources. In some embodiments, authentication program 300 includes the usage of an immutable distributed ledger and random selection of ledger copies to verify the authentication of devices requesting protected resource access.

Authentication program 300 includes an onboarding procedure that interacts with login app 117 of client device 110 to receive an IP address and encrypted MAC address of client device 110 requesting onboarding for access to protected resources, which establishes a machine and location identification. Authentication program 300 receives confirmation of approval or denial of onboarding of client device 110 from a group of predetermined administrative workstations (and their respective users), which have received the MAC address directly from login app 117 of client device 110 on the initiation of the onboarding procedure, and receiving the decryption key from client device 110 subsequent to receiving the encrypted MAC address from authentication program 300.

The administrative workstations send respective decisions on approval or denial of onboarding of client device 110 to authorization program 300, and in response to receiving greater than a threshold amount (e.g., fifty percent) of administrative workstation approvals, authentication program 300 sends an instruction to login app 117 to request the user of client device 110 to create a login password. Authentication program 300 can then send the MAC address and UID associated with client device 110 and the user of client device 110, respectively. Authentication program 300 additionally sends an instruction to amalgamate and encrypt the MAC address and UID as a single entity and send the single entity to authentication program 300. Authentication program 300 adds the amalgamated single data entity corresponding to client device 110 and the user of client device 110 as an additional entry to the distributed ledger, such as adding a block containing encrypted credentials of client device 110 to a blockchain distributed ledger.

In some embodiments, the use of a distributed ledger, for example, distributed ledger 160, to contain authentication data of both the requesting/accessing device and corresponding user/owner leverages a blockchain data set as a distributed ledger to validate and authenticate by use of selecting a copy of the ledger from a one of a plurality of logged-in workstations, each containing a copy of the distributed ledger. The risk of having compromised credential data in storage altered for unapproved access or used for impostor access is eliminated by avoiding central-storage of user and device credentials. The distributed ledger, such as a blockchain structure, acts as an immutable database for the amalgamated identifications of the combinations of user and corresponding device.

Authentication program 300 authenticates successfully onboarded devices and user combinations by receiving an encrypted combination of MAC address and UID from a requesting combination of device and user. Authentication program 300 selects a logged-in workstation from the plurality of logged-in workstations to access a copy of the distributed ledger. In some embodiments, authentication program 300 applies a least-recently-used (LRU) protocol to establish a plurality of workstations from which the selection of a workstation is made, which avoids repetitive selection of a workstation and renders the selection more unpredictable. Authentication program 300 traverses the ledger and determines whether the encrypted single entity of MAC address and UID is found in the copy of the distributed ledger and checks to determine whether the ledger entry includes an off-boarding transaction for the requesting workstation.

In response to matching the single entity data and determining an absence of an off-boarding transaction for the requesting device, authentication program 300 then generates a one-time-password (OTP) and updates table 135 on server 130 with the encrypted combination of MAC address and UID, and the OTP. Authentication program 300 transmits the OTP to the requesting device, such as client device 110. Login app 117 on client device 110 receives the OTP and sends the received OTP along with the encrypted data of the combination of MAC address and UID associated with client device 110 to server 130. Authentication program 300 instructs server 130 to compare the encrypted data an OTP received from login app 117 and encrypted data and OTP received from authentication program 300 and return a result of whether the two sets of received data match. In response to receiving a response confirming the match of the two sets of data, authentication program 300 authorizes client device 110 with a user corresponding to UID to access the protected resources.

Server 130 is depicted as including table 135. In some embodiments of the present invention, server 130 represents a virtual computing device operating based on multiple computers as a server system, such as in a cloud computing environment, and provides access and connectivity to client device 110, authentication program 300 operating on server 120, and other function and resources residing on server 130, via network 150. In some embodiments, server 130 receives instruction and data from authentication program 300 to perform a comparison of received data to data stored in table 135 and provide a result of the comparison to authentication program 300.

In some embodiments, server 130 can be a web server, a blade server, a desktop computer, a laptop computer, a tablet computer, a netbook computer, or any other programmable electronic computing device capable of receiving, sending, and processing data, and communicating with features and functions of client device 110, server 120, and other computing devices (not shown) within distributed data processing environment 100 via network 150. In another embodiment, server 130 represents a computing system utilizing clustered computers and components (e.g., database server computers, application server computers, etc.) that act as a single pool of seamless resources when accessed within distributed data processing environment 100. Server 130 may include internal and external hardware components, as depicted in more detail and described in FIG. 4.

Table 135 is a data repository depicted as hosted-on server 130. Table 135 includes data received from authentication program 300 operating on server 120 via network 150. Table 135 stores copies of an encrypted amalgamation of MAC address and UID as a single entity of onboarded devices and is updated with a one-time-password (OTP) generated by and received from authentication program 300 during authentication procedures. Each validated request for access to protected resources by a device (e.g., workstation) by matching encrypted amalgamated data of the device in a randomly selected copy of the distributed ledger results in authentication program 300 updating table 135 with an OTP corresponding to the encrypted amalgamated data of the requesting device.

Logged-in workstations 140 represents a plurality of workstations as onboarded devices and authenticated to connect to a network that includes access to protected resources. Each of the devices of logged-in workstations 140 contains a current copy of the immutable distributed ledger, which includes encrypted data for each onboarded device. The encrypted data includes encryption of an amalgamated single entity of MAC address and UID. During procedures for authenticating a successfully onboarded device requesting access to protected resources, authentication program 300 selects a device from logged-in workstations 140 to access a copy of the distributed ledger contained in the selected device.

Distributed ledger 160 is an immutable assembly of authentication data corresponding to successfully onboarded computing devices. In some embodiments, distributed ledger 160 is a blockchain of encrypted data composed of an amalgamation of MAC address and UID of a respective onboarded device. The ledger is updated as devices are added in an onboarding procedure or removed in an off-boarding procedure. Off-boarding procedures do not remove the amalgamated single entity data of a previously onboarded device but include an addition of a transaction entry added to the block of encrypted single entity data corresponding to the off-boarded device. The ledger is updated by authentication program 300 and updated copies are distributed to all actively onboarded devices of logged-in workstations 140, replacing previous versions of the distributed ledger.

Protected resources 170 represents online data or information accessible to onboarded devices that have been authenticated by authentication program 300. Access to protected resources 170 requires successful onboarding of a device requesting access and subsequent authentication via authentication program 300. In some embodiments, protected resources 170 may be company or organization trade secrets, financial information, strategic plans, employee or member information, health-related information, local or national security information, or any data or information requiring protection from unauthorized access and exposure.

Figure 2:
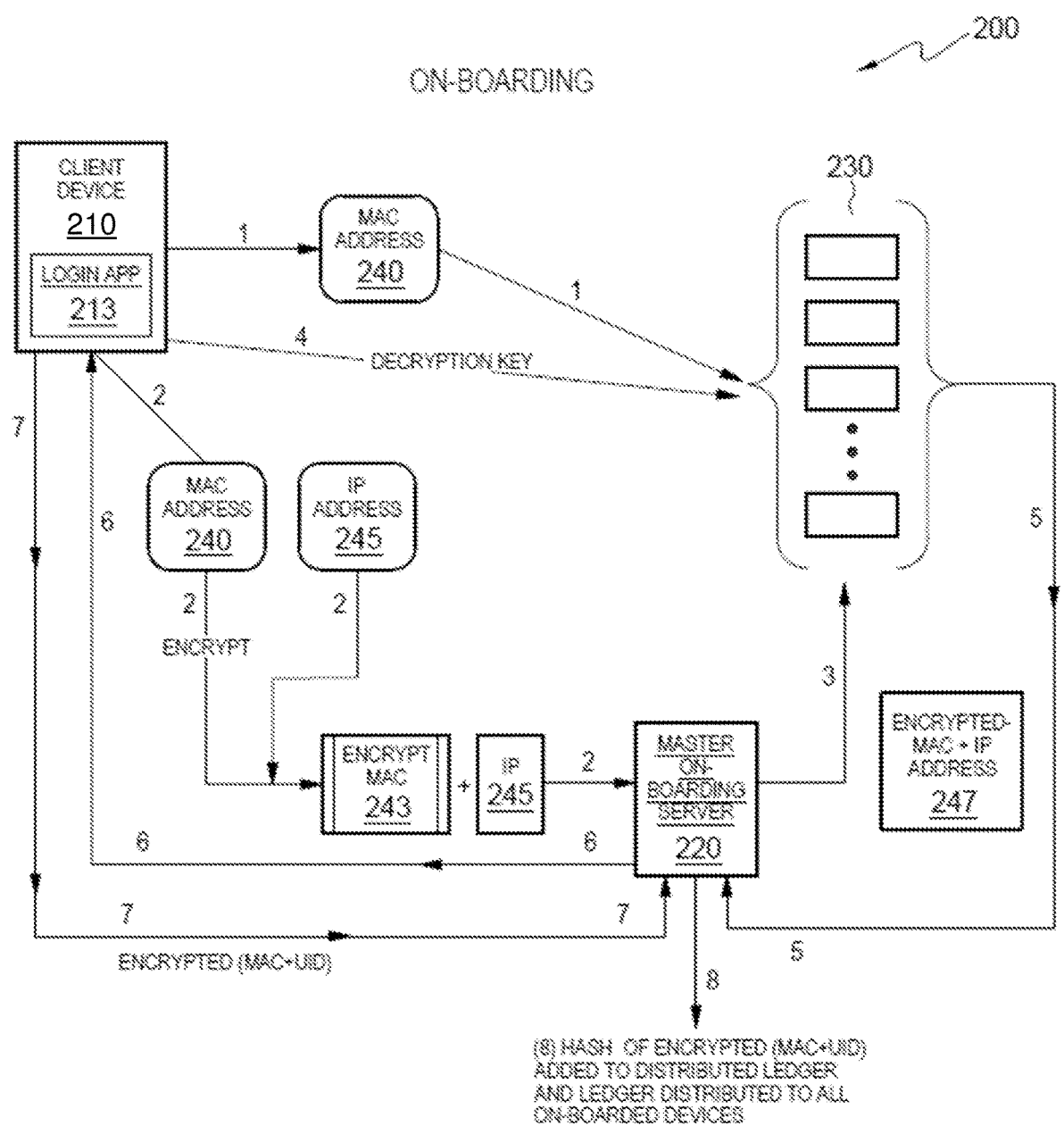
FIG. 2 is a diagram depicting the environment and component detail of the onboarding procedure of an authentication program, in accordance with embodiments of the present invention.

FIG. 2 is a diagram depicting the component detail and data flow of an onboarding procedure of authentication program 300. The onboarding procedure involves an exchange of data and instructions from multiple components of distributed data processing environment 100 and is represented in FIG. 2 and described herein to convey the contribution of authentication program 300 and interaction with other components for onboarding of computing devices.

Components of FIG. 2 include client device 210, master onboarding server 220, administrative workstations 230, MAC address 240, encrypted MAC address 243, IP address 245, and encrypted MAC address+IP address 247, and procedural steps 1-8. Subsequent to initiating an onboarding request procedure for client device 210, procedural step 1 includes login app 213 of client device 210 sending a copy of MAC address 240, associated with client device 210, to administrative workstations 230. Login app 213 is included in an initial configuration build of client device 210 and is activated by a user of client device 210 requesting onboarding of client device 210 to a network connected to protected resources 170.

Procedural step 2 of onboarding includes login app 213 sending IP address 245 of client device 210 and encrypted MAC address 243 of client device 210 to master onboarding server 220. Master onboarding server 220 sends encrypted MAC address and IP address 247, associated with client device 210, to administrative workstations 230 in onboarding procedural step 3. Administrative workstations 230 is a group of predetermined devices and corresponding users that perform approval functions for onboarding requests using a consensus approach, such that a single administrative workstation cannot approve an onboarding request of a device and associated user. In embodiments of the present invention, administrative workstations 230 includes two or more workstation devices and corresponding users. In some embodiments, an odd number of workstation devices and corresponding users are predetermined as administrative workstations 230.

Login app 213 sends a decryption key to respective devices of administrative workstations 230 in onboarding procedural step 4, and the respective devices decrypt the encrypted MAC address received from master onboarding server 220. In onboarding procedural step 5, administrative workstations 230 perform a comparison of the MAC address received directly from login app 213 of client device 210 on the initiation of the onboarding request, and the decrypted MAC address received from master onboarding server 220. Each workstation of administrative workstations 230 determines whether the two MAC addresses match, and in response to confirming a match further determines whether to approve the onboarding of client device 210. In onboarding procedural step 5, the respective comparison of MAC addresses by the plurality of workstations of administrative workstations 230 results in a consensus decision, which is sent to master onboarding server 220 regarding the onboarding approval for client device 210.

If the MAC addresses do not match, then the workstations of administrative workstations 230 deny the onboarding of client device 210. If the MAC addresses match, then each respective workstation of administrative workstations 230 may further consider whether to approve the onboarding of client device 210. For example, IP address 245 received via master onboarding server 220 may be compared to a mapping of known locations and include consideration of network separation to ensure proximity is not a potential element of misuse. In embodiments of the present invention, approval of greater than fifty percent of administrative workstations 230 results in the successful approval of administrative workstations 230.

In response to receiving a consensus of approval for onboarding from administrative workstations 230, master onboarding server 220, in onboarding procedural step 6, sends an instruction to login app 213 to generate a login password and to generate an amalgamated entity of MAC address and UID, encrypt the entity, and send the encrypted entity to master onboarding server 220. The UID for the user of client device 210 is created during an initial configuration build of client device 210. Login app 213 combines the MAC address of client device 213 and the UID of the user of client device 213 into a single entity and encrypts the single entity.

In onboarding procedural step 7, login app 213 sends the encrypted MAC address and UID single entity to master onboarding server 220. In onboarding procedural step 8, master onboarding server 220 adds the encrypted single entity of MAC address and UID associated with client device 210 to the distributed ledger, by updating the existing ledger with the addition of the encrypted single entity of client device 210, and distributing the updated ledger to all the onboarded devices, including all devices of administrative workstations 230, all previously onboarded devices that have not been subsequently off-boarded, and client device 210. Client device 210, having been successfully onboarded, may request access to protected resources 170 (FIG. 1).

Figure 3:
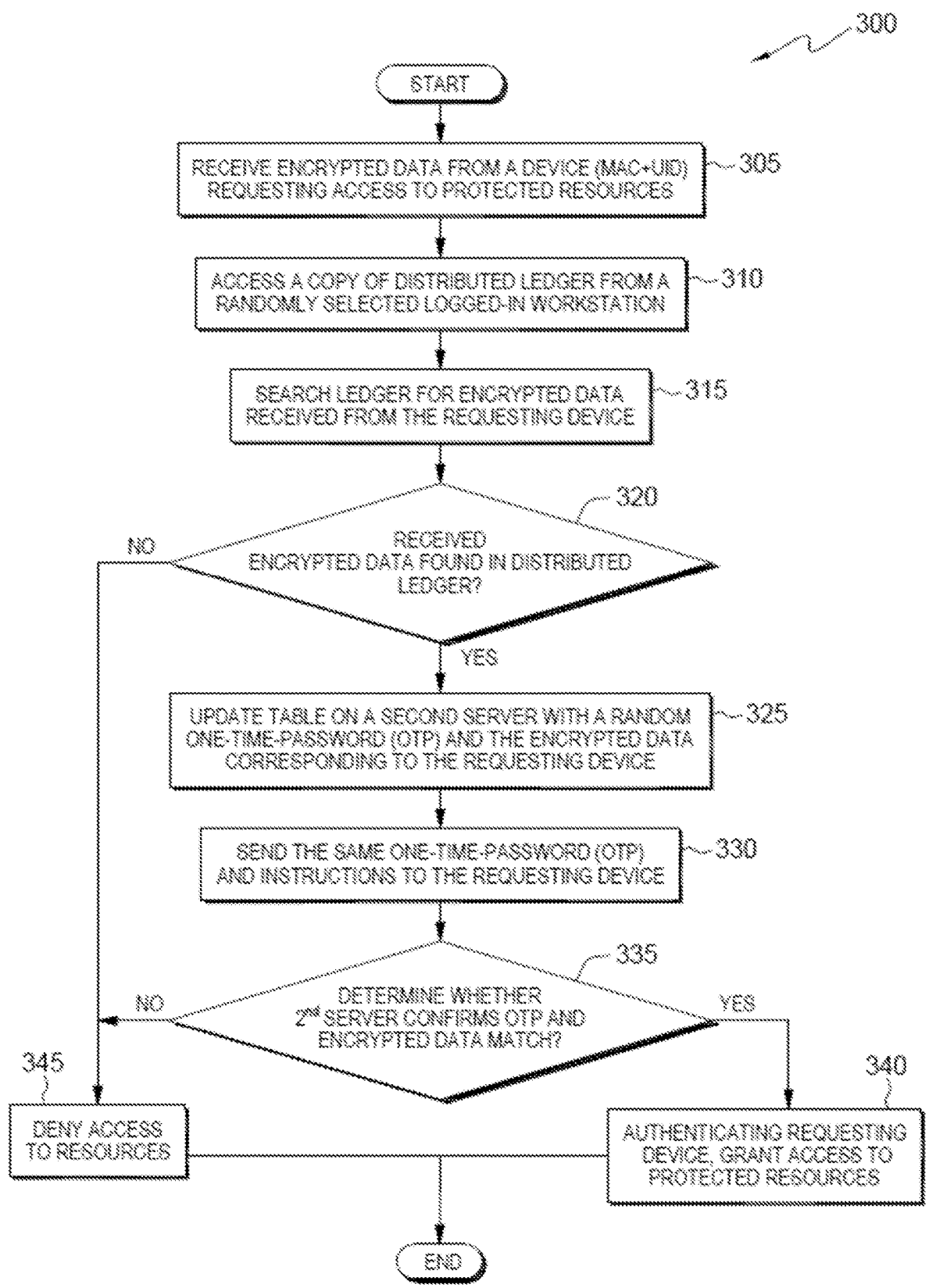
FIG. 3 is a flowchart depicting operational steps of an authentication program, operating in the distributed data processing environment of FIG. 1, in accordance with embodiments of the present invention.

FIG. 3 is a flowchart depicting operational steps of authentication program 300, operating in distributed data processing environment 100 of FIG. 1, in accordance with embodiments of the present invention. Authentication program 300 validates the authentication of a device and user combination requesting access to protected resources by applying a random selection of an instance of a distributed ledger containing credentials of approved device-user combinations.

Authentication program 300 receives encrypted data from a device requesting access to protected resources (step 305). Authentication program 300 receives an encrypted data set from the requesting device (and user operating the device). The encrypted data set includes an amalgamation of the MAC address and UID associated with the requesting device, received as a single entity. For example, (referring to FIG. 1) the user of client device 110 initiates a request for access to protected resources 170. Login app 113 generates an amalgamation of the MAC address of client device 110 and the UID of the user of client device 110 and encrypts the amalgamated data as a single entity. Login 113 sends the single entity encrypted data to authentication program 300.

Authentication program 300 accesses a copy of the distributed ledger from a randomly selected logged-in workstation (step 310). Authentication program 300 maintains a listing of all devices logged-in to the network and in some embodiments of the present invention, organizes the listing in a tree structure in which depth of traversal levels can be configured. In some embodiments, the tree structure applies a least-recently-used format for the selection of workstation devices to access a copy of the distributed ledger. Applying a least-recently-used format prevents re-selection or repetitive selection of a particular logged-in device. In some embodiments, a random number of logged-in workstations are chosen, and the selection of a copy of the distributed ledger is made from the chosen random number of least-recently-used logged-in workstations. Authentication program 300 accesses a copy from the selected logged-in workstation device.

For example, authentication program 300 determines that 100 logged-in workstations are available and randomly chooses 47 of the logged-in workstations, and determines the least-recently-used workstations, which may meet a threshold time or value of recent use. Authentication program 300 selects a workstation from the least-recently-used group and access the copy of distributed ledger 160 from the selected logged-in workstation.

Authentication program 300 searches the distributed ledger for the encrypted data received from the requesting device (step 315). Authentication program 300 performs a search of the entries in the distributed ledger for the encrypted data matching the encrypted data received from the requesting device. In some embodiments, authentication program 300 includes searching for an off-boarding transaction associated with an added block of data corresponding to the requesting device. If an off-boarding transaction is found associated with the data of the requesting device, then authentication program 300 ignores additional data to which the off-boarding transaction is applied.

For example, authentication program 300 traverses the copy of distributed ledger 160, a blockchain data structure, searching the credentials of onboarded devices, such that each block of the blockchain includes encrypted data of a single entity amalgamation of the MAC address and UID of an onboarded device. Authentication program 300 checks each block to determine whether an off-boarding transaction is applied to the onboarding credentials and ignores the data if an off-boarding transaction is present for the device.

Authentication program 300 determines whether the received encrypted data is found in the distributed ledger (decision step 320). Authentication program 300 compares the encrypted data received from the requesting device to the encrypted data included in the copy of the distributed ledger accessed from a random, least-recently-used logged-in workstation. For the case in which authentication program 300 determines that the received encrypted data is not found in the distributed ledger (step 320, "NO" branch), authentication program 300 responds to the requesting device and denies access to the protected resources (step 345), and authentication program 300 ends.

For the case in which authentication program 300 determines that the encrypted data received from the requesting device matches encrypted data included in the distributed ledger, and the encrypted data does not include an off-boarding transaction (step 320, "YES" branch), authentication program 300 updates a table maintained in a second server with a random one-time-password (OTP) and updates a table with the encrypted data corresponding to the requesting device (step 325). Authentication program 300 generates a one-time-password (OTP) and updates a table in a separate computing device, such as server 130 (FIG. 1), with the OTP. Authentication program 300 also updates the table to include the encrypted amalgamation of the MAC address and UID of the requesting device as a single entity as part of the update made to the table.

For example, authentication program 300, operating from server 120, randomly generates a one-time-password which may have a combination of numerals, lower-case and upper-case alpha characters, and special characters, and may have a designated minimum length of characters. Authentication program 300 accesses table 135 on server 130 and adds the one-time-password and the encrypted data associated with the requesting device to table 135.

Authentication program 300 sends the same one-time-password and instructions to the requesting device (step 330). Authentication program 300 duplicates the same one-time-password used to update the table of the second server and sends the password to the requesting device. Authentication program 300 also sends instructions to the requesting device to send the received one-time-password and the encrypted data, which includes the MAC address and the UID of the requesting device amalgamated into a single entity and encrypted, to the second server.

For example, authentication program 300 sends the one-time-password to client device 110 to request access to protected resources, and sends an instruction to send the one-time-password received and the encrypted data of client device 110 to server 130, which hosts table 135. Login app 117 receives the one-time-password on client device 110 and login app 117 responds to the received instruction by generating the encrypted data that includes an amalgamation of the MAC address of client device 110 and UID of the user of client device 110. Login app 113 sends the one-time-password received from authentication program 300 operating on server 120 and the encrypted data to server 130.

Authentication program 300 determines whether the second server confirms the one-time-password and encrypted data received from the requesting device matches the one-time-password and encrypted data updated to the table of the second server (decision step 335).

For the case in which the one-time-password and encrypted data received from the requesting device do not match the one-time-password and encrypted data updated in the table of the second server (step 335, "NO" branch), authentication program 300 denies the requesting device access to the protected resources (step 345), and authentication program 300 ends.

For the case in which authentication determines that the second server confirms that the one-time-password and encrypted data received from the requesting device matches the one-time-password and encrypted data updated in the table of the second server (step 335, "YES" branch), authentication program 300 authenticates the requesting device and grants access to the protected resources (step 340). The second server performs a comparison between the encrypted single entity data and one-time-password added to the table hosted in the second server by authentication program 300 to the one-time-password and encrypted single entity data sent to the second server. The second server sends the result of the comparison to authentication program 300. Authentication program 300 determines that the received data and the table data match. Authentication program 300, in step 340 confirms the authentication of the requesting device and user combination and grants access to the protected resources.

For example, server 130 compares the encrypted data sent from login app 113 of client device 110 to the encrypted data added to table 135 by authentication program 300 and sends the comparison result to authentication program 300 operating on server 120. Authentication program 300 determines from the result received from server 130 that the received encrypted data and the table encrypted data match, validating the authentication of client device 110 and the user of client device 110. Authentication program 300 grants client device 110 access to protected resources 170 and ends.

Figure 4:
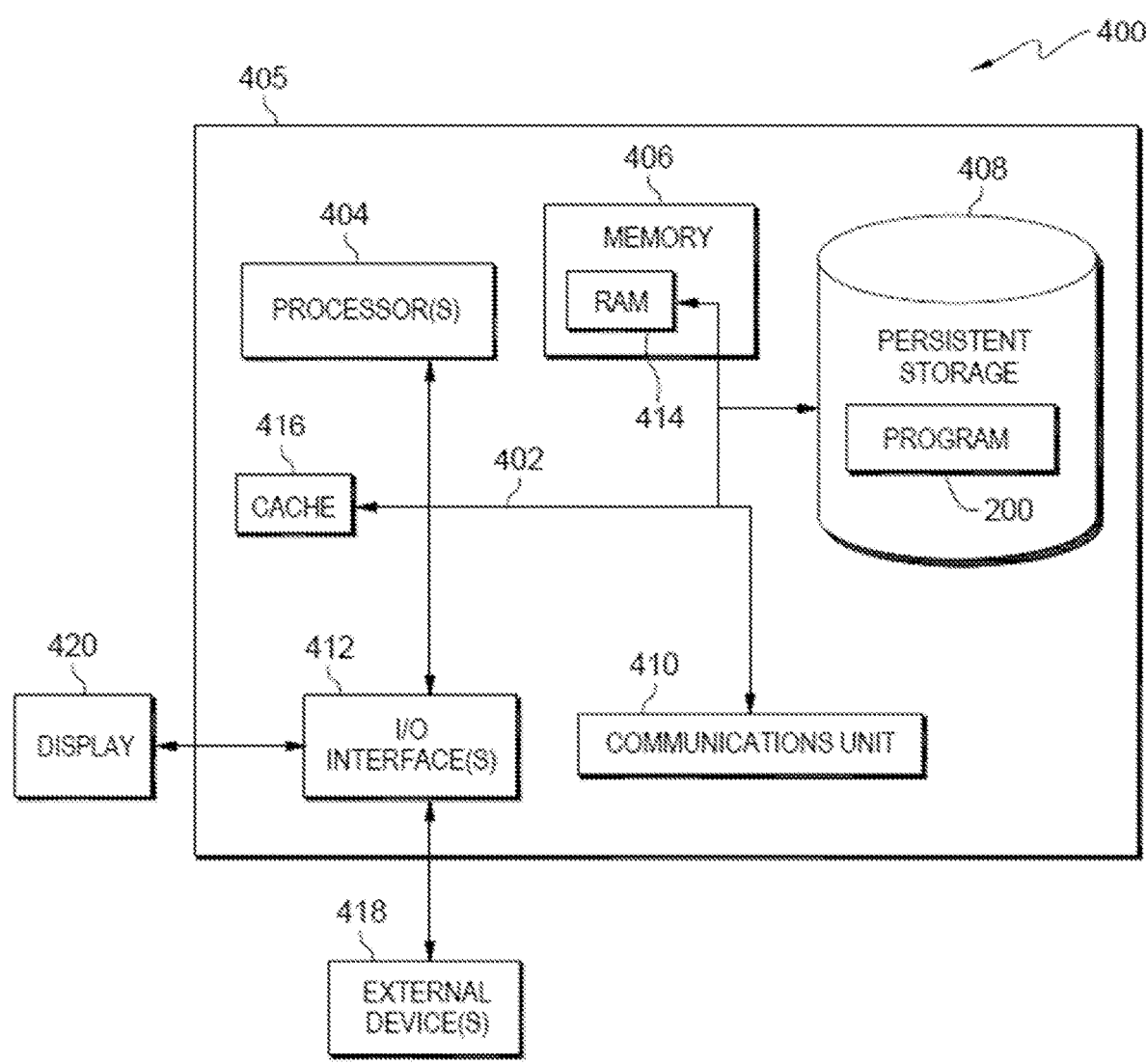
FIG. 4 depicts a block diagram of components of a computing system, including a computing device configured with the capability to operationally perform the onboarding procedure of FIG. 2, and the authentication program of FIG. 3, in accordance with an embodiment of the present invention.

FIG. 4 depicts a block diagram of components of computing system 400, including computing device 405 configured to include or operationally connect to components depicted in FIG. 1, and with the capability to operationally perform the onboarding procedure of FIG. 2, and the authentication program of FIG. 3, in accordance with an embodiment of the present invention.

Computing device 405 includes components and functional capability similar to components of client device 110, server 120, and server 130 and logged-in workstations 140 (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

In one embodiment, authentication program 300, and components of the onboarding procedure are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Authentication program 300 and components of the onboarding procedure may be downloaded to persistent storage 308 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., authentication program 300 and components of the onboarding procedure can be stored on such portable computer-readable storage media and can be loaded onto persistent storage 408 via I/O interface(s) 412. I/O interface(s) 412 also connects to a display 420.

Display 420 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of onboarding a device to a network for access to protected resources accessible on the network, the method comprising:
   receiving, by one or more processors, from the device, an encrypted media access control (MAC) address of the device and an Internet Protocol (IP) address associated with the device;
   sending, by the one or more processors, a first instruction to the device to send the MAC address of the device to a predetermined plurality of workstations performing onboarding decisions;
   sending, by the one or more processors, a second instruction to the device to send a decryption key to the predetermined plurality of workstations performing the onboarding decisions;
   sending, by the one or more processors, the encrypted MAC address of the device and the Internet Protocol (IP) address associated with the device to the predetermined plurality of workstations performing the onboarding decisions; and
   receiving, by the one or more processors, from the predetermined plurality of workstations performing the onboarding decisions, a result of whether a decrypted MAC address, determined using the encrypted MAC address of the device and the decryption key, matches the MAC address of the device sent from the device.

2. The method of claim 1, further comprising:
   determining, by the one or more processors, whether a threshold level of approval for onboarding of the device is exceeded by the predetermined plurality of workstations performing the onboarding decisions; and
   in response to determining the threshold level of approval for onboarding of the device is exceeded by the predetermined plurality of workstations performing the onboarding decisions, inserting, by the one or more processors, an encrypted amalgamated single entity into a blockchain distributed ledger of credentials of a plurality of onboarded devices.

3. The method of claim 1, further comprising:
   responsive to receiving the result of the decrypted MAC address matching the encrypted MAC address of the device sent from the device to the predetermined plurality of workstations performing the onboarding decisions, requesting from the device, by the one or more processors, the MAC address of the device and a user ID (UID) of a user of the device, as an encrypted amalgamated single entity;
   receiving, by the one or more processors, the encrypted amalgamated single entity of the MAC address and the UID; and
   inserting, by the one or more processors, the encrypted amalgamated single entity into a blockchain distributed ledger of credentials of a plurality of onboarded devices.

4. The method of claim 3, wherein the inserting comprises adding a block to the blockchain distributed ledger, the block including the encrypted amalgamated single entity, thereby creating an updated blockchain distributed ledger.

5. The method of claim 4, further comprising distributing the updated blockchain distributed ledger to all onboarded devices.

6. The method of claim 5, wherein the all onboarded devices include:
   the predetermined plurality of workstations;
   all previously onboarded devices that have not been subsequently off-boarded; and
   the device.

7. The method of claim 1, further comprising:
   receiving, by the one or more processors, from the predetermined plurality of workstations performing the onboarding decisions, a notification to off-board the device; and
   generating, by the one or more processors, an off-boarding transaction and applying the off-boarding transaction to an encrypted amalgamated single entity of the device added to a blockchain distributed ledger of credentials of the plurality of onboarded devices.

8. The method of claim 1, wherein the encrypted MAC address of the device and the IP address associated with the device are received from a login app of the device.

9. The method of claim 1, wherein the encrypted MAC address of the device and the IP address associated with the device are received by an authentication program of a server.

10. The method of claim 1, further comprising subsequently authenticating the device using an encrypted combination of an identification of the device and an identification of a user of the device.

11. A computer system for onboarding a device to a network for access to protected resources accessible on the network, the computer system comprising:
    one or more computer processors;
    one or more computer-readable storage media;
    program instructions stored on the one or more computer-readable storage media, the program instructions executable by the one or more computer processors to:
      receive from the device an encrypted media access control (MAC) address of the device and an Internet Protocol (IP) address associated with the device;
      send a first instruction to the device to send the MAC address of the device to a predetermined plurality of workstations performing onboarding decisions;
      send a second instruction to the device to send a decryption key to the predetermined plurality of workstations performing the onboarding decisions;

send the encrypted MAC address of the device and the Internet Protocol (IP) address associated with the device to the predetermined plurality of workstations performing the onboarding decisions; and receive from the predetermined plurality of workstations performing the onboarding decisions, a result of whether a decrypted MAC address, determined using the encrypted MAC address of the device and the decryption key, matches the MAC address of the device sent from the device.

12. The computer system of claim 11, wherein the program instructions are executable to:

determine whether a threshold level of approval for onboarding of the device is exceeded by the predetermined plurality of workstations performing the onboarding decisions; and in response to determining the threshold level of approval for onboarding of the device is exceeded by the predetermined plurality of workstations performing the onboarding decisions, insert an encrypted amalgamated single entity into a blockchain distributed ledger of credentials of a plurality of onboarded devices.

13. The computer system of claim 11, wherein the program instructions are executable to:

responsive to receiving the result of the decrypted MAC address matching the encrypted MAC address of the device sent from the device to the predetermined plurality of workstations performing the onboarding decisions, request from the device the MAC address of the device and a user ID (UID) of a user of the device, as an encrypted amalgamated single entity;

receive the encrypted amalgamated single entity of the MAC address and the UID; and insert the encrypted amalgamated single entity into a blockchain distributed ledger of credentials of a plurality of onboarded devices.

14. The computer system of claim 11, wherein the program instructions are executable to:

receive from the predetermined plurality of workstations performing the onboarding decisions, a notification to off-board the device; and generate an off-boarding transaction and applying the off-boarding transaction to an encrypted amalgamated single entity of the device added to a blockchain distributed ledger of credentials of the plurality of onboarded devices.

15. A computer program product comprising one or more computer readable storage media having program instructions collectively stored on the one or more computer readable storage media, the program instructions executable to:

receive from a device requesting access to protected resources, an encrypted media access control (MAC) address of the device and an Internet Protocol (IP) address associated with the device;

send a first instruction to the device to send the MAC address of the device to a predetermined plurality of workstations performing onboarding decisions;

send a second instruction to the device to send a decryption key to the predetermined plurality of workstations performing the onboarding decisions;

send the encrypted MAC address of the device and the Internet Protocol (IP) address associated with the device to the predetermined plurality of workstations performing the onboarding decisions; and receive from the predetermined plurality of workstations performing the onboarding decisions, a result of whether a decrypted MAC address, determined using the encrypted MAC address of the device and the decryption key, matches the MAC address of the device sent from the device.

16. The computer program product of claim 15, wherein the program instructions are executable to:

determine whether a threshold level of approval for onboarding of the device is exceeded by the predetermined plurality of workstations performing the onboarding decisions; and in response to determining the threshold level of approval for onboarding of the device is exceeded by the predetermined plurality of workstations performing the onboarding decisions, insert an encrypted amalgamated single entity into a blockchain distributed ledger of credentials of a plurality of onboarded devices.

17. The computer program product of claim 15, wherein the program instructions are executable to:

responsive to receiving the result of the decrypted MAC address matching the encrypted MAC address of the device sent from the device to the predetermined plurality of workstations performing the onboarding decisions, request from the device the MAC address of the device and a user ID (UID) of a user of the device, as an encrypted amalgamated single entity;

receive the encrypted amalgamated single entity of the MAC address and the UID; and insert the encrypted amalgamated single entity into a blockchain distributed ledger of credentials of a plurality of onboarded devices.

18. The computer program product of claim 15, wherein the program instructions are executable to:

receive from the predetermined plurality of workstations performing the onboarding decisions, a notification to off-board the device; and generate an off-boarding transaction and applying the off-boarding transaction to an encrypted amalgamated single entity of the device added to a blockchain distributed ledger of credentials of the plurality of onboarded devices.

* * * * *